(12) United States Patent
Kikuchi et al.

(10) Patent No.: US 7,397,747 B2
(45) Date of Patent: Jul. 8, 2008

(54) RECORDING MEDIUM TYPE DISCRIMINATION APPARATUS, RECORDING APPARATUS, AND DISCRIMINATION METHOD

(75) Inventors: Shoji Kikuchi, Kanagawa (JP); Mitsuyuki Fujibayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 499 days.

(21) Appl. No.: 10/928,351

(22) Filed: Aug. 30, 2004

(65) Prior Publication Data
US 2005/0047299 A1    Mar. 3, 2005

(30) Foreign Application Priority Data
Aug. 29, 2003    (JP)    ............... 2003-209518

(51) Int. Cl.
*G11B 7/00*    (2006.01)
(52) U.S. Cl. .................................. 369/53.22
(58) Field of Classification Search .............. 369/53.22, 369/53.27, 47.27, 116, 53.21, 275.2, 47.51
See application file for complete search history.

(56) References Cited

U.S. PATENT DOCUMENTS

| 6,700,846 B2 * | 3/2004 | Furuichi et al. | ........... 369/53.22 |
| 6,879,555 B2 * | 4/2005 | Takeuchi | ................. 369/53.23 |
| 7,149,169 B2 * | 12/2006 | Juan et al. | ................ 369/53.22 |

FOREIGN PATENT DOCUMENTS

| JP | 5-27410 | * | 2/1993 | ............... 369/53.22 |
| JP | 6-15861 | | 1/1994 | |

* cited by examiner

*Primary Examiner*—Nabil Z Hindi
(74) *Attorney, Agent, or Firm*—Fitzpatrick, Cella, Harper & Scinto

(57) ABSTRACT

According to the present invention, light is emitted by a light source at different emission intensities, and sensor output values are compared with threshold values at the individual emission intensities, so that the types of recording media having various reflection characteristics can be correctly determined.

1 Claim, 9 Drawing Sheets

OUTPUT CHARACTERISTICS OF HIGH AND LOW SENSITIVITY SENSORS FOR HIGH REFLECTIVITY SHEET

RECORDING MEDIUM TYPE DISCRIMINATION APPARATUS, RECORDING APPARATUS, AND DISCRIMINATION METHOD

BACKGROUND OF THE INVENTION

1. Field of the Invention

The present invention relates to an apparatus for discriminating a recording medium type used for a recording apparatus, a recording apparatus equipped with this discrimination apparatus, and a method for discriminating a recording medium type.

2. Related Background Art

Output apparatuses of various types, such as an electrophotographic type, a wire dot-type and an ink-jet type, are provided as output apparatuses for a printing system that forms images by attaching color toner or colored ink to the recording face of a recording media, and then discharges the image bearing recording medium.

For example, since the ink-jet type, which ejects ink from a recording head directly onto a recording medium, requires a smaller number of steps to form an image on a recording medium, its operating costs are low, it is appropriate for color recording, and it produces less noise while performing a recording operation. Therefore, in wide markets, ranging over business use to home use, attention has been drawn to the ink-jet type, and recently, it has tended to be adopted and used for many output apparatuses, such as recording apparatuses (printers), facsimile machines and copiers.

These recording apparatuses detect information concerning recording media that are to be employed, and perform recording operations based on the detection results.

A conventional method for discriminating a recording medium type is disclosed in Japanese Patent Application Laid-Open No. H6-015861. According to this method, a recording medium is irradiated by light, and the light regularly reflected by the recording medium is measured. With this arrangement, since individual recording media have different glosses because their surface roughnesses differ, depending on their types, gloss data obtained by measuring the regular light reflected by a recording medium are compared with previously stored threshold values to prepare a one-dimensional configuration for the intensity of regular reflected light, and the recording medium type is identified.

SUMMARY OF THE INVENTION

However, according to the conventional technique, detection errors occur due to variances in detection sensitivity, which is indicated by the product of the emission intensity of a light source, to irradiate a recording medium and the received light sensitivity for the reception of reflected light. Thus, the light detection sensitivity should be set to a constant, in advance, and it is necessary to adjust, during assembly, the detection sensitivity of a sensor such as a photointerrupter that includes a light-emitting unit and a light-receiving unit. When a photointerrupter for which the detection sensitivity has not been adjusted is employed as means for discriminating recording medium types, and the intensity of the light regularly reflected by a glossy sheet is measured, a detection error causes a lower value than normal to be obtained and the erroneous discrimination of the glossy sheet as a less glossy, plain sheet. As is described above, a problem with the conventional technique is that recording medium types can not be correctly identified unless the detection sensitivity of a sensor is adjusted.

Furthermore, the recording medium types available and used for ink jet printers have been increased to satisfy the needs of various applications, and for an apparatus that employs a one-dimensional configuration threshold value to discriminate recording medium types, it is difficult to correctly discriminate recording media having glosses that differ greatly and to distinguish between recording media having similar glosses, so that sometimes such recording media are erroneously identified.

It is one objective of the present invention to provide a discrimination apparatus, for discriminating the type of a recording medium, comprising: a light-emitting unit for emitting light; a light-receiving unit for receiving light having been emitted by the light-emitting unit, as reflected from the surface of the recording medium; emission intensity changing means for permitting the light-emitting unit to emit light at a plurality of emission intensities; and discriminating means for discriminating the type of the recording medium based on the intensity of the reflected light received by the light-receiving unit when the light-emitting unit has emitted light at a predetermined emission intensity.

It is another objective of the present invention to provide a discrimination method, for a discrimination apparatus that includes a light-emitting unit for emitting light and a light-receiving unit for receiving light having been emitted by the light-emitting unit, as reflected from the surface of a recording medium, and that discriminates the type of the recording medium, comprising:

an emission intensity changing step of permitting the light-emitting unit to emit light at a plurality of emission intensities;

a detecting step of detecting the intensity of reflected light received by the light-receiving unit when light is emitted by the light-emitting unit at a predetermined emission intensity; and a discriminating step of discriminating the type of the recording medium based on the intensity of the reflected light detected at the detection step.

According to this invention, to discriminate a recording medium, the emission intensity of a light source is changed, and for each emission intensity, the sensor output value is compared with a threshold value to discriminate the type of recording medium. Therefore, types of recording media having various reflective characteristics can be correctly identified.

DETAILED DESCRIPTION OF THE PREFERRED EMBODIMENTS

First Embodiment

Figure 1:
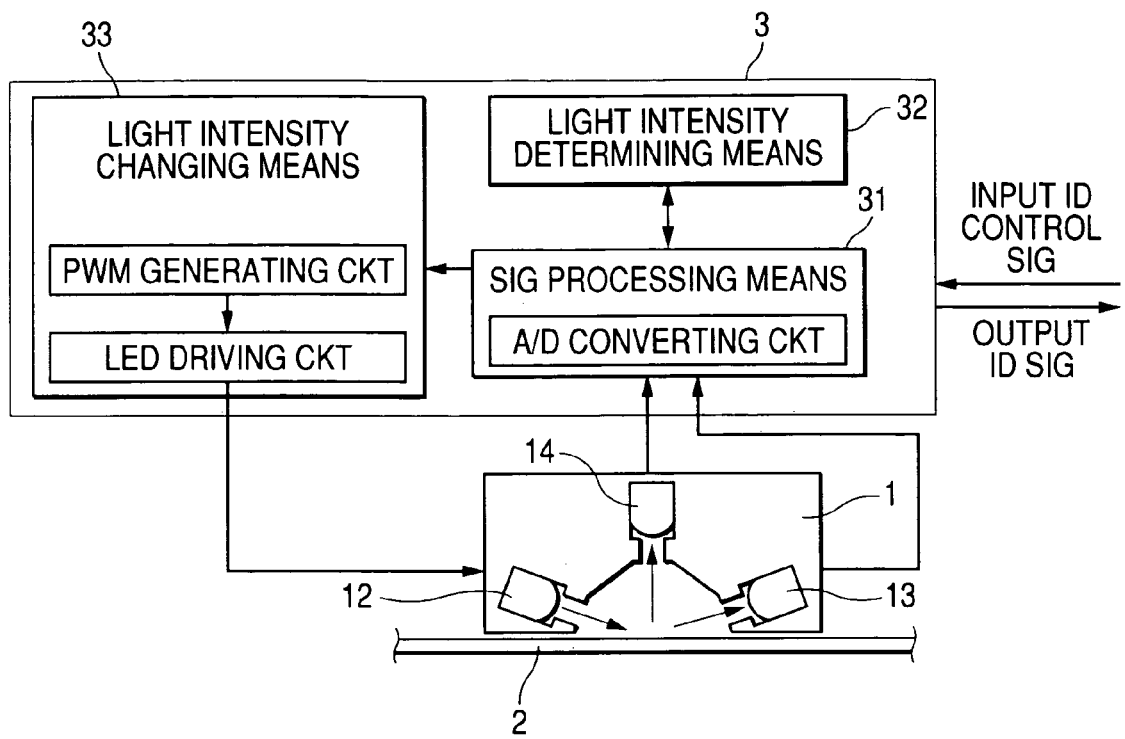
FIG. 1 is a block diagram showing an apparatus for discriminating the type of a recording medium according to a first embodiment of the present invention.

A processing apparatus for discriminating the type of a recording medium according to a first embodiment is shown in FIG. 1.

As is shown in FIG. 1, the processing apparatus that discriminates the type of a recording medium comprises: a light detector 1, including a light source and a photo-electric converter, and a processing unit 3, also called a discrimination apparatus, for processing a signal output by a sensor head and discriminating the type of a recording medium.

The light detector 1 includes: an LED 12, which functions as a source for light emissions; and sensors 13 and 14, for employing a photo-electric converter, such as a photodiode, to detect the intensity (or amount) of the reflection of the light emitted by the LED 12. For detecting the intensity of reflected light, the regular reflected light sensor 13 detects light (regular reflected light) reflected at an angle equal to the incident angle of light that is emitted, by the LED 12, to irradiate a recording medium 2, and the diffused reflected light sensor 14 detects light (diffused reflected light) that is reflected at an angle differing from the incident angle of the light emitted by the LED 12 to irradiate the recording medium 2. In this embodiment, the recording medium 2 can not only be a paper sheet, but can be any other recording medium, such as cloth or a plastic film, or a reflection reference sheet that serves as a reference for determining a threshold value used for the discrimination of the type of a recording medium. Further, the recording medium 2 can be a reflection reference sheet that is used for calibrations performed by the light detector 1.

The processing unit 3 includes: signal processing means 31 for performing, through an A/D converter (A/D converting circuit), a computation for a signal output by the light detector 1; emission intensity determining means 32, for determining the intensity (or amount) of the light emitted by the LED 12 of the light detector 1; and emission intensity changing means 33 for permitting the LED 12 to emit light at an intensity (or amount) determined by the emission intensity determining means 32, or for changing the emission intensity of the LED 12 in order to determine a emission intensity during the detection process. The signal processing means 31 also includes an A/D converter and an computing (or calculating) unit. The A/D converter converts, into a digital signal, an analog signal consonant with the intensity (or amount) of the light output by the light detector 1, and the computing unit provides compensation for the digital signal. The obtained value is a value that is detected by the light detector 1 in consonance with the reflected emission intensity of reflected light, and that is used to discriminate the type of a recording medium. The emission intensity determining means 32 includes a storage unit, a comparator and a computing unit. Based on the intensity of the light output by the LED 12 and used for the calibration by the detector 1, and the value detected by the signal processing means 31, the emission intensity determining means 32 determines the intensity (or amount) of the LED 12 emission used to discriminate the recording medium type, and stores the resultant value in the storage unit. The emission intensity changing means 33, which includes a PWM generating (or oscillating) circuit and an LED driving circuit, changes the intensity (or amount) of the LED 12 emission when emission calibration is preformed by the detector 1, or when the type of a recording medium is to be identified. Specifically, during the calibration performed by the detector 1, the PWM provided for the LED driving circuit is modulated to change the LED 12 emission intensity, and the reception intensity (detection value obtained by the signal processing means 31) at the regular reflected light sensor 13 (or the diffused reflected light sensor 14), relative to the LED 12 emission intensity, is measured until the received emission intensity at the regular reflected light sensor 13, or at the diffused reflected light sensor 14, has reached a predesignated value. Since the calibration is performed by the detector 1, it is possible to reduce the detection errors that are caused by variances in the detection sensitivity, a product of the emission intensity of a light source, such as the LED 12, and the light reception sensitivity of a sensor, such as the regular reflected light sensor 13 or the diffused reflected light sensor 14.

Figure 2:
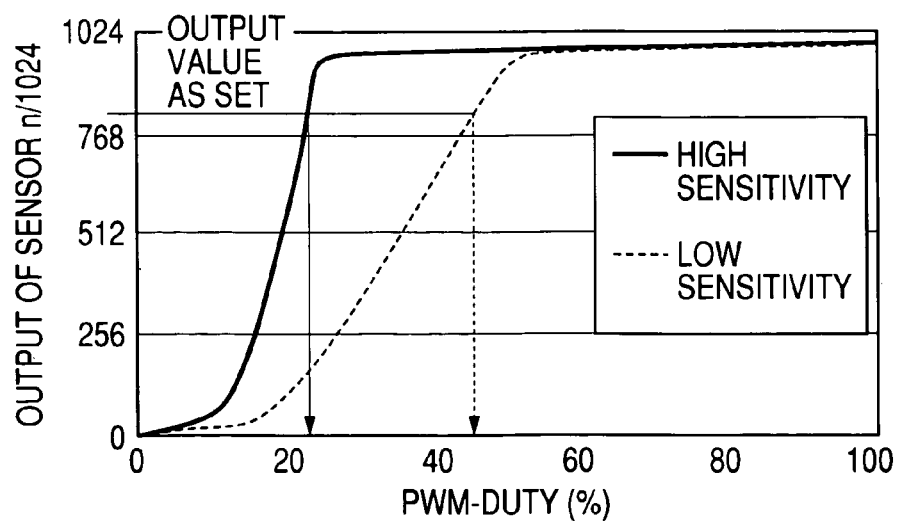
FIG. 2 is a characteristic graph showing the emission intensities of a high sensitivity sensor and a low sensitivity sensor, and a sensor output value.

The relationship between the emission intensities at sensors having different received light sensitivities and the values (detection values) output by the sensors is shown in FIG. 2.

In FIG. 2, a recording medium (a reference sheet of white PET) having a comparatively high reflectivity is irradiated, and the light reflected is measured. Further, in FIG. 2 are shown, the characteristics of regular reflected light intensities, which are obtained using a high sensitivity sensor and a low sensitivity sensor. The horizontal axis represents a change, effected by the emission intensity changing means, in a current for driving the LED 12, i.e., a change in the emission intensity of the LED 12. The vertical axis of the graph represents a sensor output value (reception intensity) relative to the emission intensity of the LED 12, which is obtained by the signal processing means 31.

To determine a emission intensity, the emission intensity of the LED 12 is changed, and until the reception intensity of the regular reflected light sensor 13 reaches a predesignated value, i.e., until the sensor output value in FIG. 2 reaches 800, the operation is repeated for gradually increasing or reducing the drive duty for PWM driving and changing the current for driving the LED 12. Then, the drive duty values for PWM driving, relative to the drive current, i.e., in FIG. 2, a drive duty value of 24% for the high sensitivity sensor and a drive duty value of 44% for the low sensitivity sensor, are stored in the storage unit of the emission intensity determining means 32 as determined emission intensity values, used to discriminate the recording medium type.

Through this processing, a detection error caused by a variance in the detection sensitivity, which is a product of the emission intensity at a light source and the light reception sensitivity that are respectively provided for the LED and the photo-electric converter of the sensor used to discriminate a recording medium type, can be reduced without the detection sensitivity being adjusted to a constant value during the assembly process. The output value of the regular reflected light sensor 13 has been explained, and the same explanation an be applied for the output value of the diffused light sensor 14.

Figure 3:
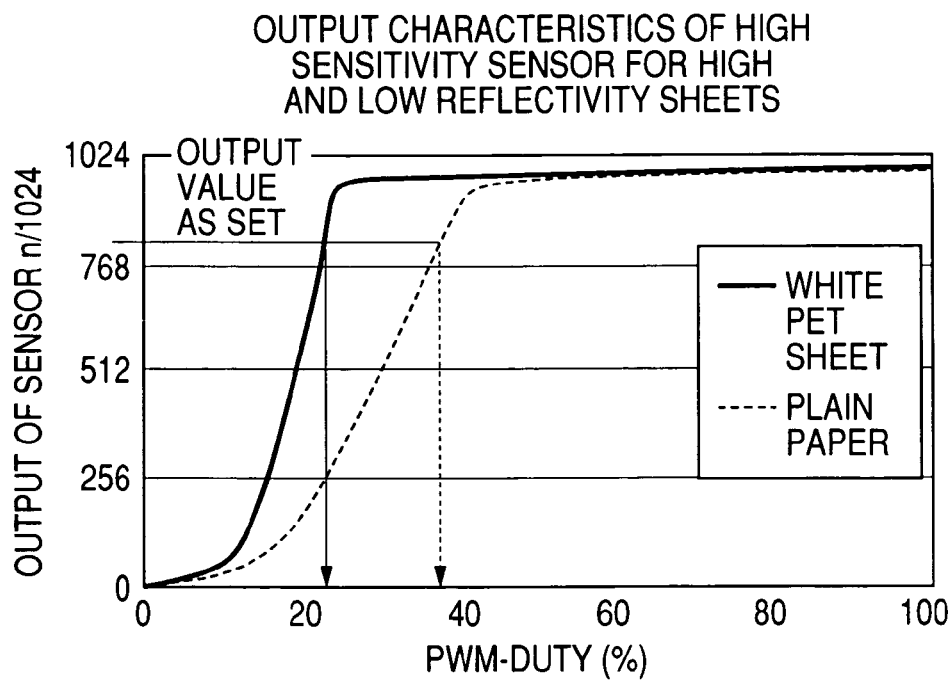
FIG. 3 is a characteristic graph showing the emission intensities for a recording medium having a high reflectivity characteristic and a recording medium having a low reflectivity characteristic, and a sensor output value.

FIG. 3 is a graph showing the relationship between the emission intensity for recording media having different reflectivitites, and the value output by a sensor.

In FIG. 3, a recording medium (white PET sheet), having a comparatively high reflectivity, and a recording medium (plain sheet), having a comparatively low reflectivity, are irradiated, and the reflected light is measured. The characteristics of the intensity of regular reflected light, obtained by a high sensitivity sensor is shown in FIG. 3. It is apparent from FIG. 3 that when the predesignated sensor output value is 800, 24% is the PWM drive duty value for the white PET and 38% is the PWM drive duty value for the plain paper. In this specification, the predesignated sensor output value is also called a reference reflected emission intensity. As is described above, the previously mentioned operation need only be repeated to obtain a plurality of light intensities that are consonant with a plurality of types of recording media having different reflectivities and different reflected light intensities, and a plurality of reference reflected light intensities can be obtained. According to this invention, a plurality of threshold value sets are provided based on the thus obtained reference reflected light intensities, and a recording medium type can be identified.

Figure 4:
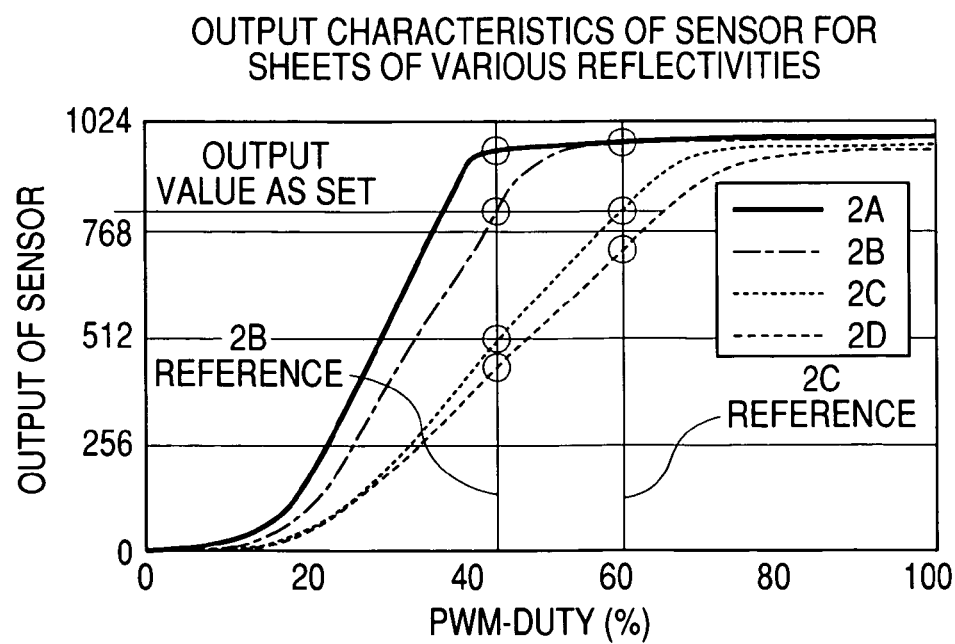
FIG. 4 is a characteristic graph showing the emission intensities for recording media having different reflectivities, and a sensor output value according to the first embodiment and a second embodiment of the present invention.

FIG. 4 is a graph showing the emission intensities for recording media having different reflectivities, and the values output by a sensor.

In FIG. 4, the PWM drive duty value for the LED, 12 functioning as a light source, is changed to alter the emission intensity, and at different intensities, four types of recording media, 2A, 2B, 2C and 2D, arranged in the descending order of their reflectivities, are irradiated. The intensity reflected light at this time, i.e., the output characteristic obtained by the sensor, is shown in FIG. 4.

When the processing apparatus in FIG. 1 is employed to discriminate a recording medium type, initially, a first set of threshold values are obtained that are in consonance with the reference reflected emission intensity. In this embodiment, the recording medium 2B is employed as a reference reflective sheet to obtain the first set of threshold values, and the PWM drive duty for the LED 12 is calculated in consonance with the reference intensity of light reflected by the recording medium 2B. As is shown in FIG. 4, when the reference reflected emission intensity is the sensor output value of 800, the PWM drive duty of the LED 12 for the recording medium 2B is 45%. Next, the recording media is irradiated with the PWM drive duty of 45% for the LED 12, and the sensor output value, which is the reflected emission intensity, is obtained. In FIG. 4, when the light is emitted with the 45% PWM drive duty of the LED 12, the sensor output values for the recording media 2A, 2C and 2D are 959, 497 and 439. It should be noted that the sensor output values are ten-bit digital values.

Following this, the threshold values used to discriminate a recording medium type are obtained.

Since there is a difference between the sensor values output for the recording media 2A and 2B, i.e., 959 and 800, in a range of from 800 to 959, 900 is provided as a threshold value G11, so that the types of the recording media 2A and 2B can be identified. Similarly, for the recording media 2B and 2C, in the range of 497 to 800, only 650 need be provided as a threshold value G12. However, since there is not large difference between the sensor output values for the recording media 2C and 2D, i.e., 497 and 439, these recording media may be erroneously identified even though a value between 439 to 497 is provided as a threshold value G13. This is because a range within which the sensor output value may fall is present, even when the recording media are of the same type.

Therefore, like the recording media 2C and 2D, since between the sensor output values there is only a very small difference, the emission intensity of the LED 12 is changed and the sensor output value is re-detected to obtain a second set of threshold values.

While the recording medium 2C is employed as a reference reflective sheet, the PWM drive duty value for the LED 12 is obtained, in the same manner, in consonance with the reference reflected emission intensity. As is shown in FIG. 4, 61% is the PWM drive duty for the LED 12 in consonance with the reference intensity for light reflected by the recording medium 2C. When light is emitted with a PWM drive duty of 61% for the LED 12, for the recording media 2A, 2B and 2D, the sensor output values are 972, 967 and 708. Since there is a considerable difference between the sensor output values for the recording media 2C and 2D, i.e., 800 and 708, within a range of 708 to 800, 755 can be provided as a threshold value G21.

Figure 5:
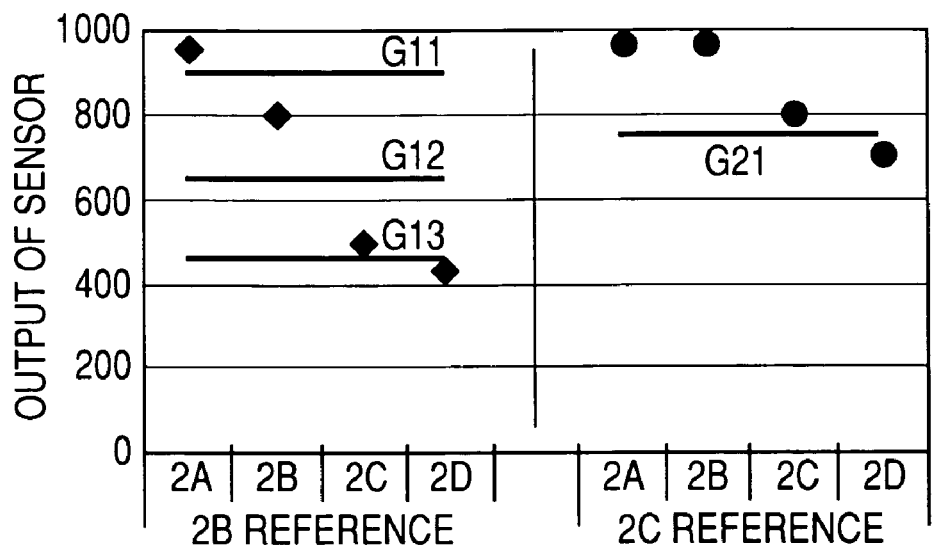
FIG. 5 is a graph showing sensor outputs for individual recording media relative to emission intensities, and threshold values according to the first embodiment.

When the obtained threshold values G11, G12 and G21 are compared with the sensor value output by the light detector 1, the four recording media 2A to 2D can be identified (see FIG. 5). On the left side in FIG. 5 are shown the sensor values output for the individual recording media 2A to 2D when the recording medium 2B is employed as a reference reflective sheet and the LED 12 is driven at the PWM drive duty of 45%. On the right side in FIG. 5 are shown the sensor values output for the individual recording media 2A to 2D when the recording medium 2C is employed as a reference reflective sheet, and the LED 12 is driven at the PWM drive duty of 61%.

Based on an ID control signal received by the processing unit 3 and an ID signal output by the processing unit 3, the thus arranged discrimination apparatus for discriminating a recording medium type interacts with the other processors in a recording apparatus or in an external device connected to the recording apparatus.

Figure 6:
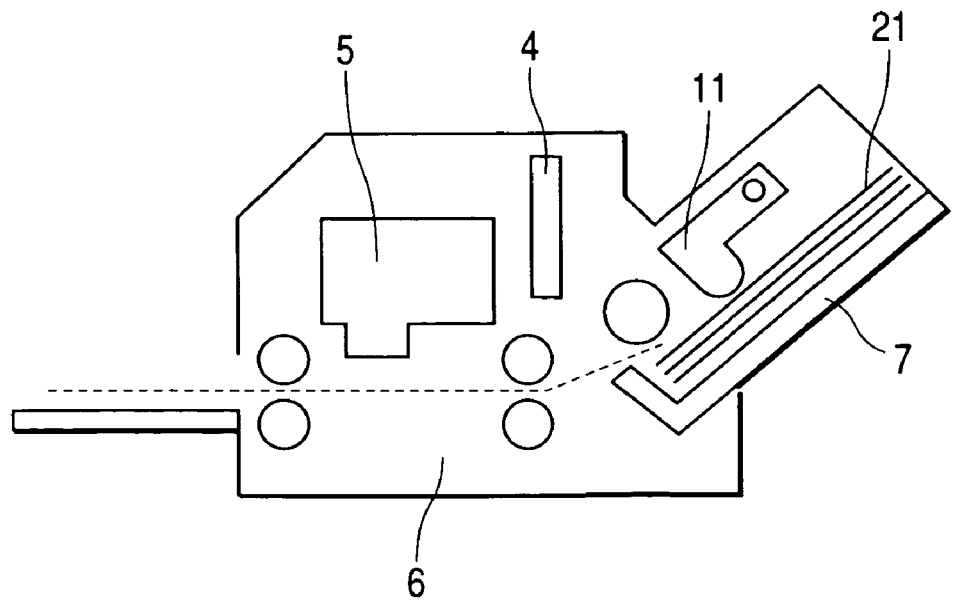
FIG. 6 is a cross-sectional view of the essential portion of a recording apparatus that incorporates the apparatus for discriminating the type of a recording medium.

FIG. 6 is a cross-sectional view of the essential portion of an example recording apparatus that incorporates the discrimination apparatus for discriminating a recording medium type.

In FIG. 6, the light detector 1 is mounted on an arm 11, and recording media 21 are stacked on a recording media stacking unit 7. The arm 11 is located at a position opposite the recording media stacking unit 7 to discriminate, as needed, types of recording media 21 mounted on the recording media stacking unit 7. When no recording media are mounted on the recording media stacking unit 7, calibration of the light detector 1 may be performed. A circuit board 4, which is used to operate the recording apparatus, includes one or all of the components of the processing unit 3 shown in FIG. 1, and discriminates a recording medium type or performs a recording operation. A block 5 denotes a recording head, and a path (conveying path) 6 is used to feed the recording medium 21 when the recording operation is initiated.

As is described above, according to the embodiment, in the process for discriminating a recording medium, the emission intensity of a light source is changed, and at each of emission intensity, the sensor output value is compared with the threshold value to discriminate a recording medium type. With this arrangement, recording media having various reflection characteristics can be correctly discriminated.

In this embodiment, the emission intensity of the light source has been determined based on the two recording media. However, depending on the reflection characteristic of the recording medium, three or more types of recording media may be employed to determine the emission intensity. In this case, threshold values are determined for the different light intensities. A recording medium having a high reflectivity and a recording medium having a low reflectivity must be selected as the reference reflective sheets, and the threshold values must be obtained based on these recording media, so that the recording media type can be correctly identified.

In this embodiment, the reference reflected emission intensity has been the sensor output value of 800. However, another value may be employed as the sensor output value.

Furthermore, in this embodiment, threshold values used to discriminate a recording medium have been obtained. However, the threshold values may be designated in advance at the time a product is shipped. In this case, a purchaser of a product need not perform an operation to obtain a threshold value. Further, the operation for obtaining a threshold value may also be performed only when the threshold value must be re-designated because, over time, the sensor has had to be changed.

In addition, in this embodiment, the sensor output value obtained by measuring the intensity of regular reflected light has been employed. However, the sensor output value obtained by measuring the intensity of diffused reflected light may be employed to discriminate a recording medium type. Moreover, both the sensor output value for the regular reflected light and the sensor output value for the diffused reflected light may be employed to discriminate a recording medium type. In this case, the sum of the two output values is employed.

In this embodiment, the light detector has been located at a position opposite the recording medium stacking unit. However, to discriminate a recording medium type, the light detector may be located at another appropriate location, for example, near a recording head or along a recording medium conveying path.

Second Embodiment

In the first embodiment, a recording medium having a high reflectivity and a recording medium having a low reflectivity were employed as reference reflective sheets for obtaining two emission intensities for a light source. In a second embodiment, a third emission intensity is obtained by a computation based on the two emission intensities.

As is shown in FIG. 4, for the recording media 2B and 2C, the emission intensities of the LED 12 relative to the reference reflected emission intensity, i.e., the PWM drive duties, are 45% and 61%. To obtain a third emission intensity, a predetermined recording medium may be employed as a reference reflective sheet, as in the first embodiment. However, in the second embodiment, the third emission intensity is obtained by a computation based on the first and the second emission intensities for the PWM drive duties of 45% and 61%.

A value located midway between the first and the second emission intensities is employed as the third emission intensity; specifically, the PWM drive duty for the third emission is defined as 53%. As in the first embodiment, a threshold value for discriminating a recording medium type is provided for the third emission intensity, and the sensor output values for the individual recording media are measured. In this manner, the type of a recording medium can be identified. When the third emission intensity is employed, the type can be identified for a recording medium that has a reflectivity characteristic situated midway between those for the recording media 2B and 2C.

As is described above, when the emission intensity at the light source is obtained by a computation performed in accordance with the reflection characteristic of a recording medium to be identified, and when a threshold value is set in consonance with the emission intensity, recording medium types having various reflection characteristics can be identified.

In the second embodiment, the value midway between (½ value) the first and the second emission intensities has been defined as the third emission intensity. However, consonant with the reflection characteristic of a recording medium to be identified, a ¼ value may be employed as the third emission intensity in accordance. Further, consonant with the reflection characteristic of a recording medium to be identified, additional emission intensities may be obtained. In this case, threshold values in accordance with the individual emission intensities should be supplied for use when discriminating a recording medium type.

Third Embodiment

A third embodiment relates to a processing apparatus for discriminating a recording medium type while taking into account a peripheral temperature change for a light detector.

Figure 7:
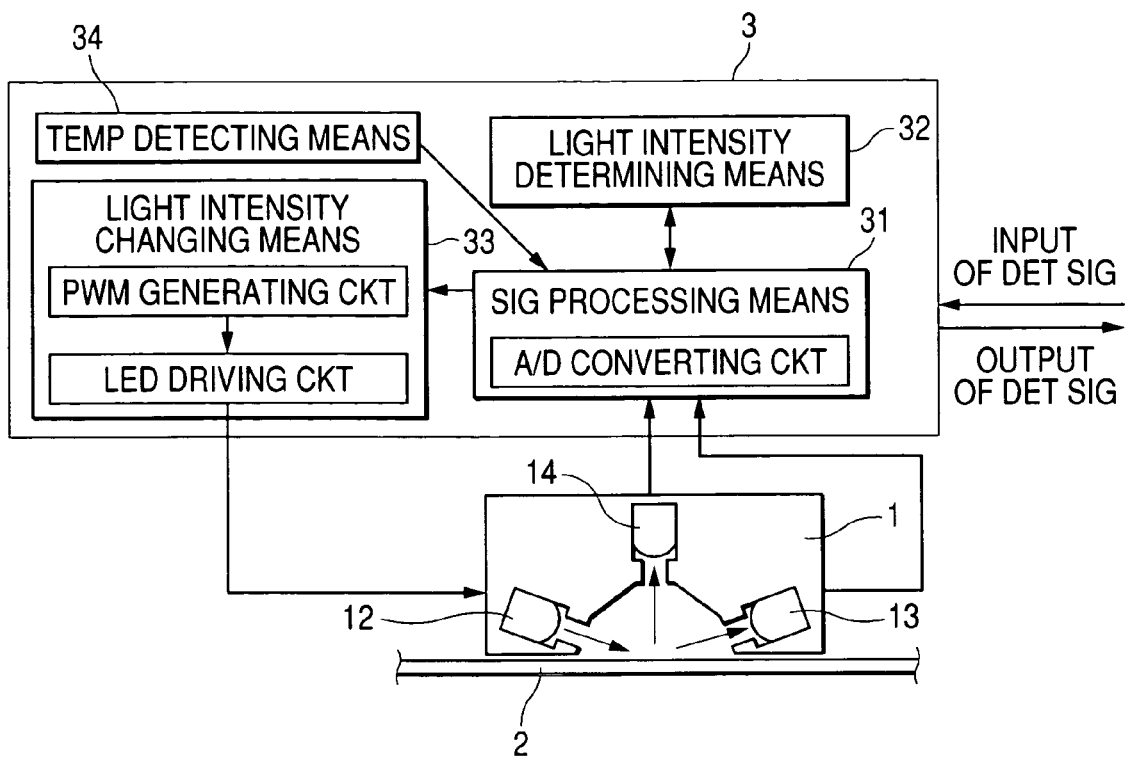
FIG. 7 is a block diagram showing an apparatus for discriminating the type of a recording medium according to a third embodiment of the present invention.

FIG. 7 is a block diagram showing a processing apparatus, like that shown in FIG. 1 for the first embodiment, for discriminating a recording medium type. A difference from the apparatus shown in FIG. 1 is that temperature detecting means 34, for detecting the temperature, is provided.

Figure 8:
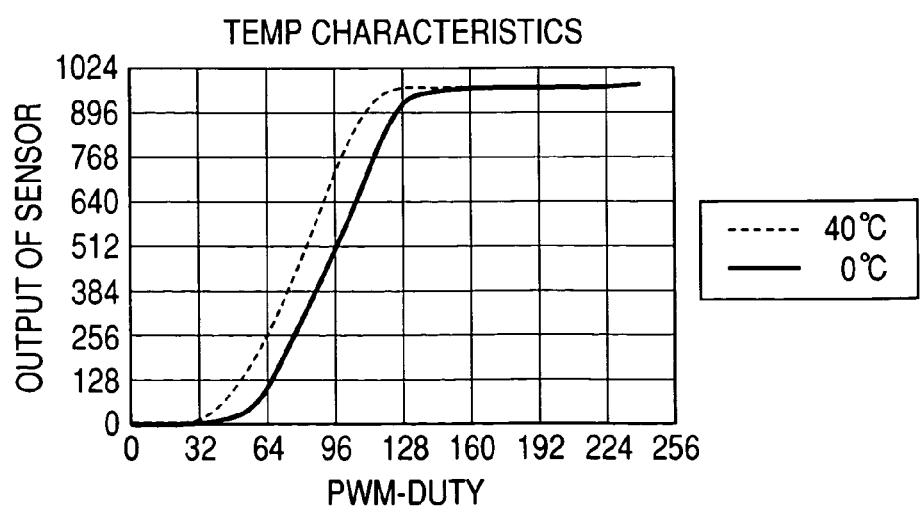
FIG. 8 is a characteristic graph showing emission intensities and sensor output values at different temperatures.

FIG. 8 is a graph showing the relationship between the PWM drive duty of an LED 12 and the sensor output value when the LED 12 irradiates a recording medium is measured by a photo-electric converter at different peripheral temperatures for a light detector 1.

As in the first embodiment, emission intensity changing means 33 changes a drive current for the LED 12 to alter the emission intensity, and it is apparent from FIG. 8 that the sensor output value differs at the peripheral temperatures of 0° C. and 40° C. That is, in the process for discriminating a recording medium type, since the sensor output value differs depending on the peripheral temperature, even though the light source is driven at a PWM drive duty, the type of recording medium may not be correctly identified based on the sensor output value. The emission intensity of the LED 12 varies depending on the temperature, and this is assumed to cause the sensor output value to be altered in accordance with the temperature change.

In this embodiment, therefore, the drive current for the LED 12 is altered in accordance with a temperature change, so that the same sensor output value is constantly obtained even when the peripheral temperature is changed. Specifically, as is shown in FIG. 8, the temperature characteristic of the light detector 1 is measured in advance, and a value for correcting the PWM drive duty relative to the temperature is stored as a correction coefficient in the storage unit of emission intensity determining means 32. At this time, a table representing information for values for correcting the PWM drive duties that correspond to the individual temperatures is stored in the storage unit. Based on the peripheral temperature obtained by the temperature detecting means 34, the emission intensity determining means 32 determines whether to drive the light source at a corrected PWM drive duty.

As is described above, since the emission intensity of the light source can remain constant even though the peripheral temperature for the light detector 1 is changed, the sensor output value can remain constant, regardless of whether there is a temperature change. As a result, a processing apparatus can be provided that can always correctly discriminate a recording medium type, In this embodiment, the drive duty for the light source is changed when a temperature change occurs. However, the sensor output value may be corrected in accordance with the temperature change to always obtain a constant sensor output value.

Furthermore, in this embodiment, the processing apparatus for discriminating a recording medium type has been employed as an example. However, this embodiment may also be applied for an image reading apparatus.

Further, when the apparatus for this embodiment is employed to discriminate a recording medium type in the manner explained in the first embodiment, upon the occurrence of a temperature change, the PWM drive duty must be corrected and used during different correction processes performed for individual emission intensities, because the light source is driven at different emission intensities.

In addition, the above embodiments are merely examples, and the present invention is not limited these embodiments. That is, the present invention can be applied not only for the preferred embodiments described above, but also for various other modes without departing from the subject of the invention. For example, for a configuration wherein processing devices, such as a computation unit and a storage unit, are optimally arranged for an apparatus that incorporates these components.

Fourth Embodiment

In a fourth embodiment, for a recording apparatus that comprises a recording medium type discrimination apparatus in the third embodiment, a detailed explanation will be given for the calibration processing performed for an discrimination apparatus and the processing performed to discriminate a recording medium type.

Figure 9:
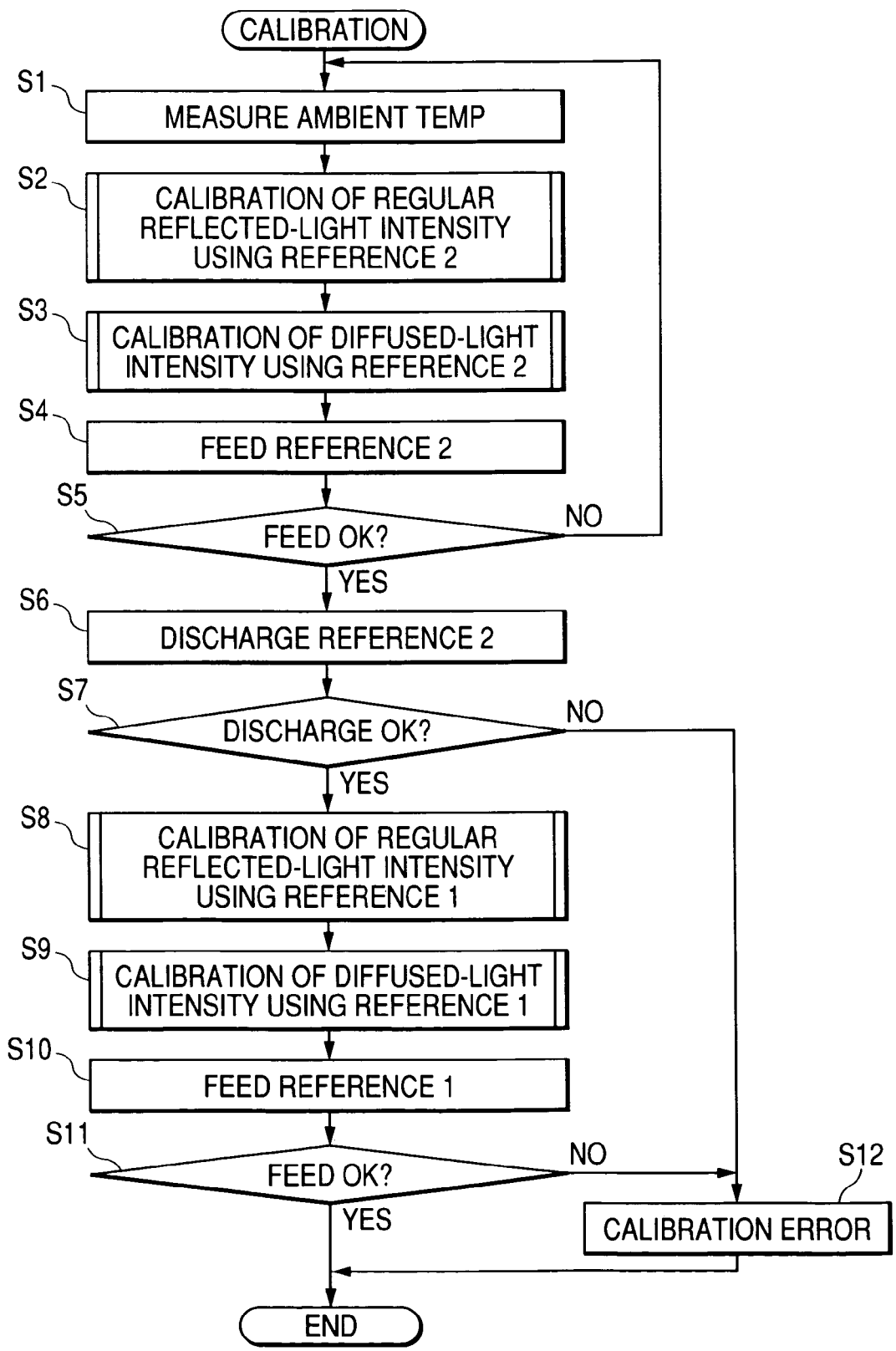
FIG. 9 is a flowchart showing the calibrations performed by an apparatus for discriminating the type of a recording medium according to a fourth embodiment of the present invention.

FIG. 9 is a flowchart for the processing performed to calibrate the apparatus for discriminating a recording medium type.

Calibration of the apparatus for discriminating a recording medium type is performed by using a reference medium (not limited to a paper recording medium; any other medium, such as film or metal, that is available can be used, so long as it has a predetermined reflection characteristic). In this embodiment, a white PET recording medium having a comparatively high reflection characteristic and a plain paper sheet having a comparatively low reflection characteristic are employed as reference media, and hereinafter, the white PET is called reference 1 and the plain sheet is called reference 2. Specifically, calibration of the discrimination apparatus is performed and the drive duty for the light source is determined, so that the detection value obtained by the light detector for the characteristic of a predetermined recording medium, such as reference 1 or reference 2, is equal to the value of a reference reflected emission intensity.

First, the ambient temperature of the iscrimination apparatus is measured by the temperature detecting means 34 in FIG. 7 (step S1).

Then, while reference 2, mounted on the recording media stacking unit of the recording apparatus, is employed, calibration is performed to obtain the drive duty for the LED 12 that is required when a light-receiving device, which detects both regular reflected light and diffused reflected light, detects a predetermined reference reflected emission intensity (steps S2 and S3). Calibration performed using a predetermined reference to obtain the drive duty for the LED 12 will be described later.

Following this, the reference 2 is fed by the feeding operation, and the discharging operation is performed (steps S4 to S6). At this time, at step S5, a check is performed to determine whether the feeding operation has been successful. When the feeding operation has not been successful, program control returns to step S1, so that calibration can be performed again. A check is also performed to determine whether the discharging operation has been successful (step S7), and when the discharging operation has not been successful, a calibration error is reported (step S12).

Next, as at steps S2 and S3, calibration is performed by using reference 1, which is mounted on the recording media stacking unit (steps S8 and S9). When reference 2 and reference 1 are mounted in order on the recording media stacking unit before calibration of the discrimination apparatus is initiated, calibration can be sequentially performed for the two references. In this manner, calibration of the discrimination apparatus can be efficiently performed.

Then, the reference 1 is fed by the feeding operation, and a check is performed to determine whether the feeding operation has been successful (steps S10 and S11). When the feeding operation has been successful, calibration of the discrimination apparatus is terminated. When it is determined at step S11 that the feeding operation has not been successful, a calibration error is reported (step S12).

Figure 10:
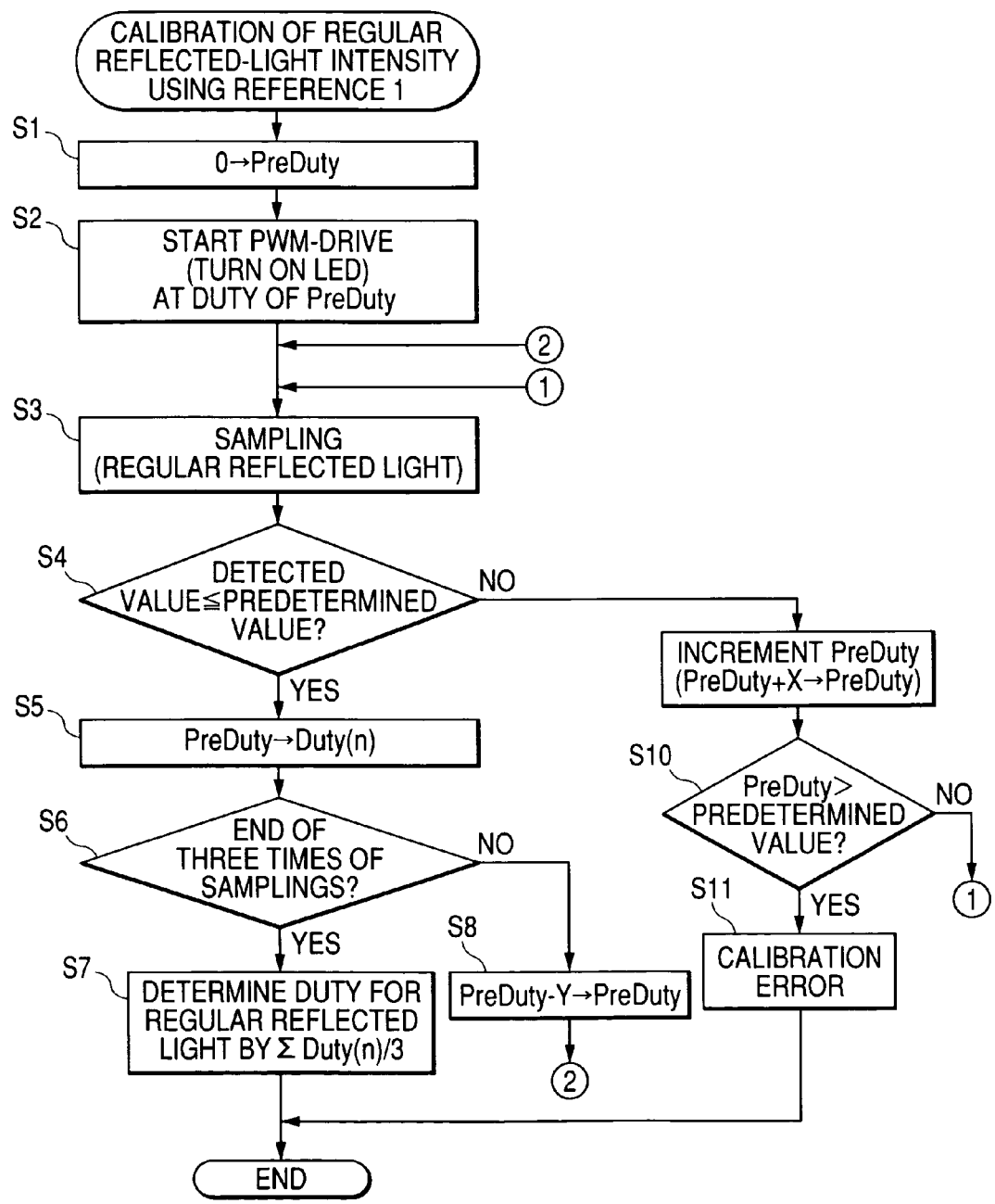
FIG. 10 is a flowchart showing the processing according to the fourth embodiment for obtaining a drive duty for a light source when reference 1 is detected.

FIG. 10 is a flowchart showing the process, at step S8 in the flowchart in FIG. 9, for obtaining the drive duty for the light source whereat the light-receiving device receiving regular reflected light detects a predetermined reference reflected emission intensity. In the process in FIG. 10, a drive duty for the light source is obtained whereat the regular reflected light sensor employs the reference 1 to detect the predetermined reference reflected emission intensity. As in FIG. 10, at steps S3, S8 and S9 in FIG. 9, a drive duty for the light source is obtained whereat the light-receiving device employing a predetermined reference detects a predetermined reference reflected emission intensity.

First, a value of 0 is substituted into PreDuty, which is the drive duty for driving the light source, and the light source emits light at the PreDuty (steps S1 and S2).

After light has been emitted at the emission intensity obtained at step S2, the reception intensity of the regular reflected light sensor is detected (also called sampling), and a check is performed to determine whether the detection value is equal to or smaller than a predetermined value (steps S3 and S4). The predetermined value that is used for the determination at step S4 is a value obtained when the light detector 1 detects the characteristic of the recording medium of reference 1, and corresponds to a reference reflected emission intensity in the first embodiment. The reference reflected emission intensity can be a detection value for the sensor 13 or 14 of the light detector 1, or a value corresponding to the detection value, such as a voltage value obtained by A/D conversion of the value detected by the sensor 13 or 14.

When the detection value at step S4 is equal to or smaller than the predetermined value, the value of the PreDuty is incremented, i.e., the PreDuty is added to a predetermined value X (step S9). In this manner, since the value of the PreDuty is incremented and exceeds 0%, the drive duty for of the light source whereat the detection value of the reference reflected emission intensity can be acquired.

Next, a check is performed to determine whether the value of the PreDuty is greater than a predetermined value. When the value of the PreDuty is equal to or smaller than the predetermined value, program control returns to step S3, or when the value of the PreDuty is greater than the predetermined value, a calibration error is reported (steps S10 and S11). The predetermined value used at step S10 is defined as a value that is greatly exceeds a predicted drive duty for the LED whereat the light detector 1 detects the reference reflected emission intensity as the characteristic of the reference 1.

Further, when at step S4 the value detected by the regular reflected light sensor 13 is greater than the predetermined value, the value of the PreDuty, which was detected at the n-th time, is substituted into Duty(n), and a check is performed to determine whether the sampling times three has been terminated. When the sampling times three has not yet been completed, a predetermined value Y is subtracted from the PreDuty value, and program control returns to step S3 (steps S5, S6 and S8). The predetermined value Y is subtracted from the PreDuty value at step S8, because in this embodiment, in order to perform a correct calibration, the average value is obtained through three sampling processes, and an appropriate PreDuty is again obtained by the subtraction of the predetermined value Y. Since the predetermined value Y is subtracted from the PreDuty value, the period required for calibration can be reduced compared with the processing wherein the appropriate PreDuty value is obtained by incrementing it beginning at PreDuty=0 at step S1.

When it is determined at step S6 that the sampling times three has been completed, the average value for Duty(1) to Duty(3) is obtained, and the drive duty of the light source at the time of the detection of a recording medium type is determined, so that the regular reflected light sensor can detect a predetermined reflected emission intensity (step S7). The processing is thereafter terminated.

Since calibration for the light detector 1 is performed in this manner, it is possible to determine or correct the drive duties for the light source whereat the regular reflected emission intensity and the diffused reflected emission intensity are detected for the reference 1 and the reference 2.

Furthermore, since as is shown in FIG. 10 the average value is obtained by performing sampling times three, and is used to determine the drive duty for the light source, detection errors caused by electric noise can be reduced. Further, since the motors and the recording head of the recording apparatus are halted during the sampling process, the effect produced by electric noise can be suppressed.

The calibration in FIGS. 9 and 10 may be performed by a user or before a product is shipped from a factory. When the sensor deteriorates over time elapses (detection accuracy is reduced) and a recording medium type can not be correctly identified, the user must perform the calibration. When a sensor is not greatly affected by deterioration, the factory may perform the calibration before the recording apparatus is shipped, and in this case, calibration need not be performed by the user.

The processing for discriminating a recording medium type will now be explained in detail.

In this embodiment, the third emission intensity is calculated by using the first emission intensity for the reference 1 and the second emission intensity for the reference 2, which are determined during the processing in FIGS. 9 and 10. Since the first to third emission intensities differ between when the regular reflected emission intensity is detected and when the diffused reflected emission intensity is detected, in this embodiment, six types of emission intensities are present. The method for calculating the third emission intensity will be described below.

The following is an expression for obtaining the drive duty for the light source by which the regular reflected emission intensity is detected, relative to the third emission intensity. It should be noted that the n-th emission intensity in the following explanation means the n-th emission intensity (i.e., the drive duty for the light source) whereat the regular reflected emission intensity is detected.

> The third emission intensity=(the second emission intensity−the first emission intensity)/2+the first emission intensity As is indicated by this expression, a value midway between the first and the second emission intensities is defined as the third emission intensity for the detection of the regular reflected light.

The calculation expressions are as follows for obtaining the drive duty for the light source whereby the diffused reflected emission intensity is detected relative to the third emission intensity. It should be noted that the n-th emission intensity in the following explanation means the n-th emission intensity (i.e., the drive duty for the light source) whereat the diffused reflected emission intensity is detected.

When the first emission intensity<the second emission intensity:

> third emission intensity=(the second emission intensity−the first emission intensity)/2+the first emission intensity When the first emission intensity=the second emission intensity:

> third emission intensity=the first emission intensity (=the second emission intensity)

When the first emission intensity>the second emission intensity:

> third emission intensity=(the first emission intensity−the second emission intensity)/2+the second emission intensity As is indicated by these expressions, the value midway between the first emission intensity and the second emission intensity is defined as the third emission intensity for the detection of the diffused reflected light.

Figure 11:
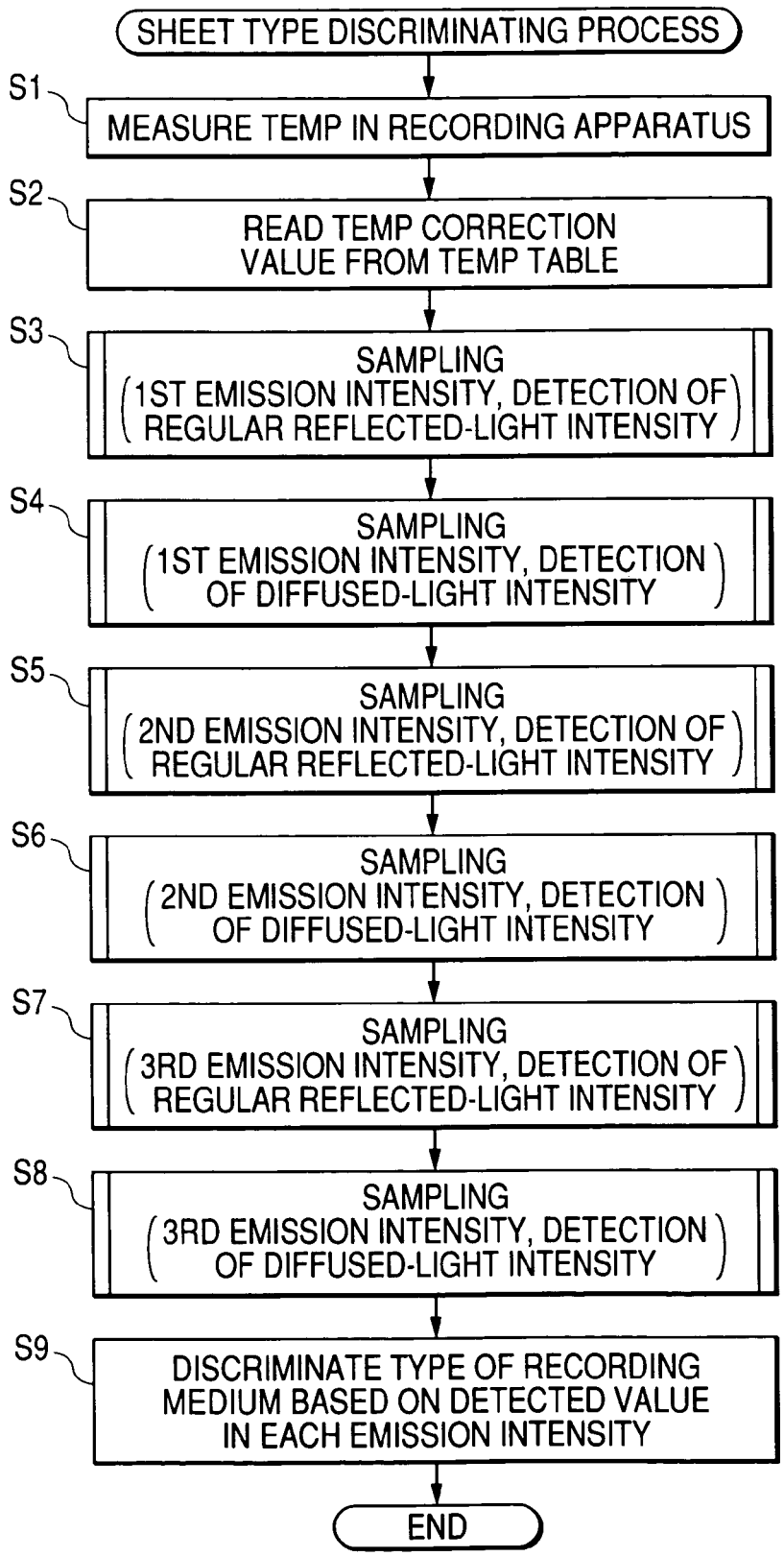
FIG. 11 is a flowchart showing the processing for discriminating the type of a recording medium according to the fourth embodiment.

FIG. 11 is a flowchart for the processing, performed by a recording apparatus equipped with the discrimination apparatus for discriminating a recording medium type.

First, when a recording instruction is received from a host connected to the recording apparatus, the temperature of the recording apparatus is measured (step S1). To detect the internal temperature of the recording apparatus, the temperature detecting means 34 for the third embodiment for detecting the peripheral temperature for the light detector 1 may be employed. Following this, information for a correction value corresponding to the measured temperature is read from the table that is stored in the storage unit of the light changing means 32 and that relates to the correction values for the PWM drive duty in correlation with the temperatures (step S2).

Then, the emission intensity, which is detected by the regular reflected light sensor 13 of the light detector 1, is obtained, and when the light source is driven to emit light at the first emission intensity (the emission intensity whereat the intensity of the regular reflected light for the reference 1 is detected) (step S3). The operation for irradiating the recording medium and for detecting the reflected emission intensity is also called a sampling operation. Following this, the emission intensity is obtained that is measured by the diffused reflected light sensor 14 of the light detector 1 when the light source is driven to emit light at the first emission intensity (the emission intensity whereat the intensity of diffused reflected light for the reference 1 is detected) (step S4).

Next, as at steps S3 and S4, the light intensities are obtained that are detected by the regular reflected light sensor 13 and the diffused reflected light sensor 14 when the light source is driven to emit light at the second emission intensity (steps S5 and S6).

Further, as at steps S3 and S4, the light intensities are obtained that are detected by the regular reflected light sensor 13 and the diffused reflected light sensor 14 when the light source is driven to emit light at the third emission intensity (steps S7 and S8).

Sequentially, the recording medium type is discriminated based on the values for the regular reflected light intensities and the diffused reflected light intensities, which are detected at steps S3 to S8 when the light source has irradiated the recording medium at the individual emission intensities (step S9). Thereafter, the processing for discriminating the recording medium type is terminated.

Through this processing, since the regular reflected emission intensity and the diffused reflected emission intensity are detected after the emission intensity for the same recording medium has been changed, the recording medium type can be correctly discriminated. Furthermore, since the light source emits light only when the reflected emission intensity is detected, the service life of the LED that functions as a light source can be extended, and the power consumed by the recording apparatus can be reduced.

In the flowchart in FIG. 11, for discriminating the recording medium type, the regular reflected emission intensity and the diffused reflected emission intensity are detected separately. However, when the same emission intensity is employed for the detection of the regular reflected emission intensity and for the detection of the diffused reflected emission intensity, both the regular reflected emission intensity and the diffused reflected emission intensity may be detected at the same time.

Figure 12:
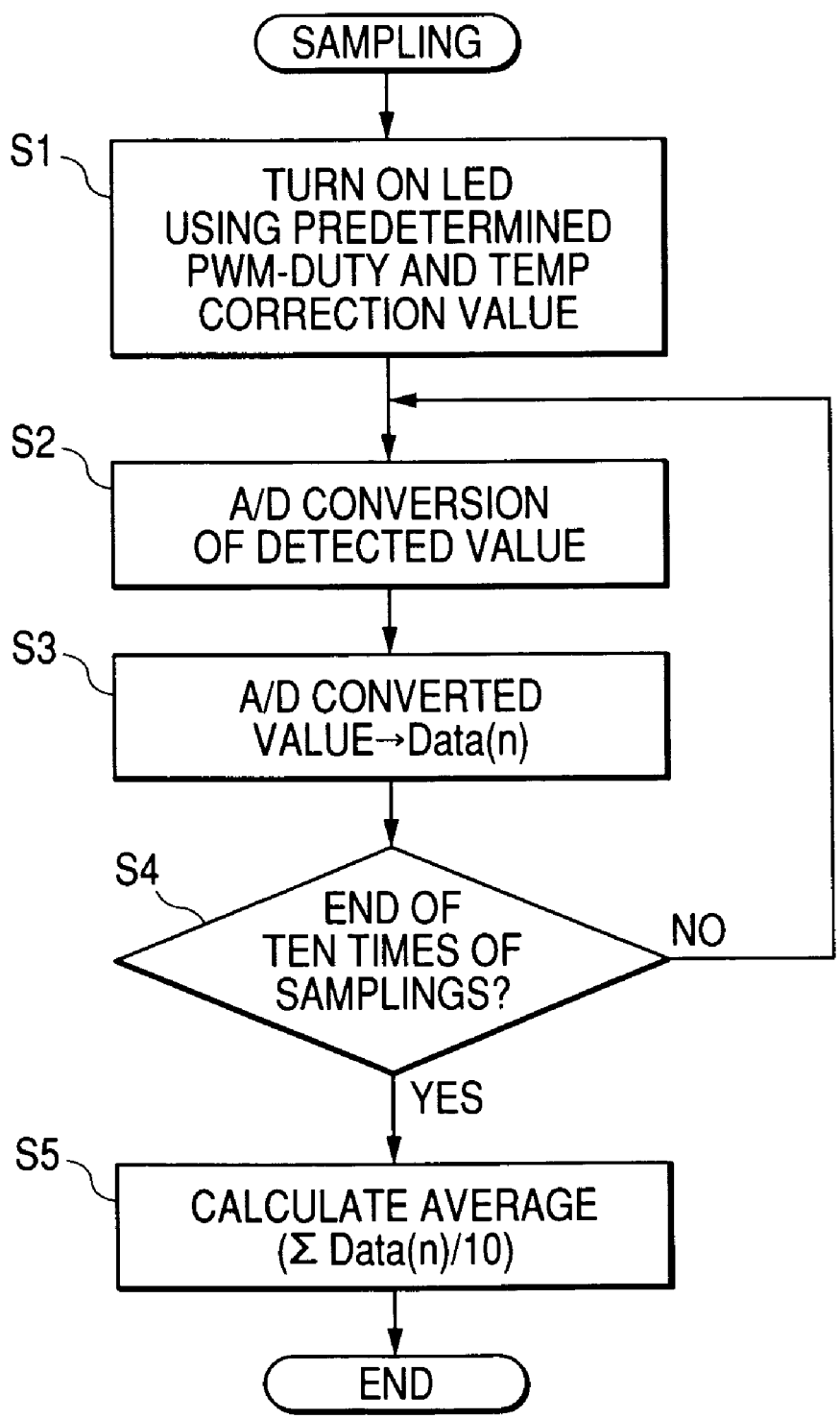
FIG. 12 is a flowchart showing the sampling processing for discriminating a recording medium type according to the fourth embodiment.

FIG. 12 is a flowchart showing the sampling operation performed at steps S3 to S8 in FIG. 11 for detecting a reflected emission intensity.

First, a recording medium is irradiated at a predesignated drive duty (first to third emission intensity) while taking into account the temperature correction value obtained at steps S2 in FIG. 11 (step S1).

The regular reflected light sensor 13 or the diffused reflected light sensor 14 detects the reflected emission intensity, and the signal processing means of the discrimination apparatus 3 performs A/D conversion for the detected value (step S2).

Following this, the value obtained by A/D conversion of the value detected at the n-th time is substituted into Data(n), the obtained value is stored in a memory (step S3), and a check is performed to determine whether the tenth sampling has been completed (step S4). When the tenth sampling has not yet been completed, program control returns to step S2.

When it is determined at step S4 that the tenth sampling has been completed, the average value of Data(1) to Data(10) is calculated, and is defined as the value of the reflected emission intensity detected under an individual condition, such as emission intensity, the regular reflected light or diffused reflected light (step S5).

Through this processing, the values detected by the individual reflected light sensors at different emission intensities can be obtained.

Figure 13:
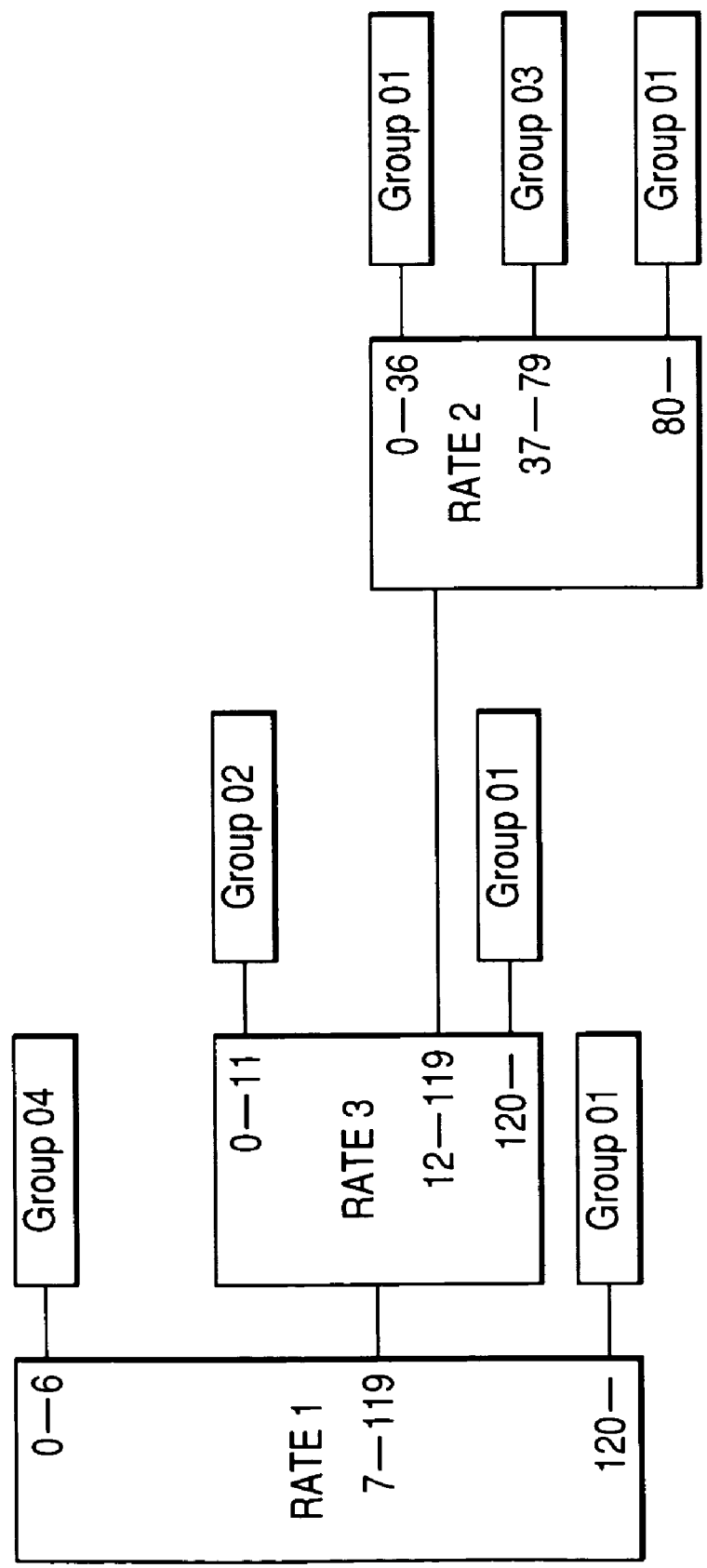
FIG. 13 is a chart for discriminating the type of a recording medium based on a value detected by each sensor according to the fourth embodiment.

FIG. 13 is a chart for discriminating a recording medium type based on the detection values that, through the processing performed in FIGS. 11 and 12, the reflected light sensors have obtained at the individual emission intensities.

In this embodiment, the recording medium type is identified based on the rate of the detection values of the regular reflected light sensor 13 and the diffused reflected light sensor 14 at the first to the third emission intensities. The rate of the detection values for the sensors 13 and 14 at the first emission intensity is a rate 1, and similarly, the rates at the second and the third emission intensities are a rate 2 and a rate 3. In this case, the rate=regular reflected light detection value/diffused reflected light detection value. In this embodiment, four recording media, plain paper, gloss paper, coated paper and OHP film, are identified, and respectively constitute Group 01 to Group 04.

As is shown in FIG. 13, when a value obtained at the rate 1 is 0 to 6, the recording medium is determined to be Group 04 (OHP film), and when the value is equal to or greater than 120, the recording medium is determined to be Group 01 (plain paper). When the value at the rate 1 is 7 to 119, the recording medium type can not be correctly identified based merely on the value at the rate 1, and the value at the rate 2 and, as needed, the value at the rate 3 are employed for this determination.

When the value at the rate 1 is 7 to 119, and the value at the rate 3 is 0 to 11, the recording medium is determined to be Group 02 (gloss paper), and when the value at the rate 1 is equal to or greater than 120, the recording medium is determined to be Group 01 (plain paper). When the value at the rate 3 is 12 to 119, the recording medium type can not be correctly identified using the value at the rate 1 or 3, and thus the value at the rate 2 is employed for the determination.

When the value at the rate 1 is 7 to 119, the value at the rate 3 is 12 to 119, and the value at the rate 2 is 0 to 36, the recording medium is determined to be Group 01 (plain paper). When the value at the rate 2 is 37 to 79 while the value at the rates 1 and 3 are those described-above, the recording medium is determined to be Group 03 (coated paper). When the value at the rate 2 is 80 or greater while the values at the rates 1 and 3 are those described above, the recording medium is determined to be Group 01 (plain paper).

Since the recording medium type is determined in the above described manner, recording media having various reflection characteristics can be correctly identified. Even when recording media of different types have similar reflection characteristics, the values at the rates 1 to 3 need only be compared with the threshold values, so that the types of the recording media can be correctly determined.

In the above embodiments, the third emission intensity has been calculated by using the first and the second emission intensities. However, a fourth emission intensity may be calculated to increase the number of recording medium types to be identified. For a recording medium that shows a reflection characteristic similar to another medium under a predetermined emission intensity and that shows a different reflection characteristic under another emission intensity, the emission intensities need only be calculated, so that, during the process for discriminating the recording medium, the reflection characteristics for the recording medium can be detected by changing the emission intensity.

In the fourth embodiment shown in FIG. 11, the reflected light intensities under all the emission conditions are detected, and thereafter, the recording medium type can be determined. Instead of this configuration, the reflected emission intensity under a predetermined emission condition may be detected, and thereafter, the process for determining a recording medium type may be performed. In this case, when the recording medium can be identified, this process is thereafter terminated, and when the recording medium type can not be identified, the reflected emission intensity under the next emission condition is detected. That is, when the recording medium type can be identified in accordance with the rate 1 that is obtained based on the detection values obtained at steps S3 and S4 in FIG. 11, i.e., when the rate 1 is six or smaller, or 120 or greater, the processing for discriminating the recording medium type is terminated. When the recording medium type can not be identified, the processes at steps S5 and S6 in FIG. 11 are performed. Since the recording medium type discriminating process is performed after the reflected emission intensity is detected for a predetermined emission intensity, the period required for the recording medium type discriminating process can be reduced as for Group 01 and Group 04, the types of which can be identified based on only the value at the rate 1 in the fourth embodiment.

This application claims priority from Japanese Patent Application No. 2003-209518 filed Aug. 29, 2003, which is hereby incorporated by reference herein.

What is claimed is:

1. A discrimination apparatus for discriminating a type of recording sheet, comprising:
    a light-emitting unit for emitting light;
    a light-receiving unit for receiving light having been emitted by said light-emitting unit, as reflected from the surface of said recording sheet;
    emission intensity changing means for permitting said light-emitting unit to emit light at a plurality of emission intensities being different from each other so as to discriminate the type of said recording sheet;
    discriminating means for discriminating the type of said recording sheet based on the intensity of said reflected light received by said light-receiving unit when said light-emitting unit has emitted light at a predetermined emission intensity; and
    temperature detecting means for detecting a peripheral temperature for said light-emitting unit,
    wherein said emission intensity changing means changes said predetermined emission intensity based on said peripheral temperature detected by said temperature detecting means.

* * * * *

UNITED STATES PATENT AND TRADEMARK OFFICE
CERTIFICATE OF CORRECTION

PATENT NO. : 7,397,747 B2
APPLICATION NO. : 10/928351
DATED : July 8, 2008
INVENTOR(S) : Kikuchi et al.

Page 1 of 1

It is certified that error appears in the above-identified patent and that said Letters Patent is hereby corrected as shown below:

COLUMN 4:
Line 1, "a" should read --an--.
Line 3, "an" should read --a--.
Line 22, "preformed" should read --performed--.
Line 55, "a" should read --an--.

COLUMN 5:
Line 10, "an" should read --can--.
Line 38, "LED, 12" should read --LED 12,--.

COLUMN 6:
Line 5, "not" should read --not a--.

COLUMN 9:
Line 10, "type," should read --type.--.
Line 28, "limited" should read --limited to--.
Line 42, "an" should read --a--.
Line 65, "iscrimination" should read --discrimination--.

COLUMN 11:
Line 1, "of" should be deleted.

Signed and Sealed this

Third Day of February, 2009

JOHN DOLL
*Acting Director of the United States Patent and Trademark Office*